Patented Oct. 16, 1934

1,977,376

UNITED STATES PATENT OFFICE 1,977,376

PRODUCTION OF SODIUM CARBONATE DECAHYDRATE

George Lewis Cunningham, Niagara Falls, N. Y., assignor to The Mathieson Alkali Works, Inc., New York, N. Y., a corporation of Virginia No Drawing. Application July 26, 1932, Serial No. 624,885. Renewed January 12, 1934

4 Claims. (Cl. 23—63)

This invention relates to improvements in the manufacture of sodium carbonate decahydrate, $Na_2CO_3 \cdot 10H_2O$. More particularly, the invention relates to improvements in the direct production of sodium carbonate decahydrate from sodium chloride, ammonia and carbon dioxide.

According to the present invention, sodium carbonate decahydrate and ammonium chloride are simultaneously formed from an aqueous eutectic solution of sodium carbonate decahydrate and ammonium chloride, that is an aqueous solution saturated with respect to sodium carbonate decahydrate and ammonium chloride, by the addition of sodium chloride, ammonia and carbon dioxide to the eutectic solution in appropriate proportions, and at appropriate temperatures. The temperature should not exceed about 15° C. A temperature approximating 0° C. is particularly advantageous. The proportions of ammonia and carbon dioxide should be such that the molecular ratio of $CO_2$ to free base, that is the OH—equivalent, in the solution from which the sodium carbonate decahydrate and ammonium chloride are precipitated has a value approximating 0.2–0.5. A value for this ratio approximating 0.4–0.5 is particularly advantageous. The proportion of sodium chloride is not so important. The operation is advantageously carried out with the weight ratio of NaCl to the water content of the eutectic solution at a value approximating 1:6–1:12. A higher proportion of sodium chloride involves the handling of very heavy slurries and a lower proportion of sodium chloride involves the handling of large quantities of the eutectic solution. The precipitated sodium carbonate decahydrate and ammonium chloride are separated from the solution and from each other. The eutectic solution in which the operation of the invention is carried out, is reused, cyclically. The composition of this eutectic solution remains substantially unchanged during repeated cycles of operation.

To initiate the operation of the invention, water may be saturated at the operating temperature with sodium carbonate decahydrate and ammonium chloride, and the eutectic solution so prepared then used as the medium in which sodium chloride, ammonia and carbon dioxide are converted to sodium carbonate decahydrate and ammonium chloride. The reactions involved may be summarized as follows:

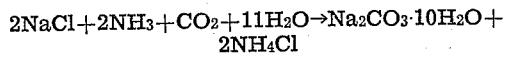

$2NaCl + 2NH_3 + CO_2 + 11H_2O \rightarrow Na_2CO_3 \cdot 10H_2O + 2NH_4Cl$

The order in which the sodium chloride, ammonia and carbon dioxide are added to the medium in which the conversion is effected is not important. If the ammonia and carbon dioxide are added separately, it is advantageous to add first the ammonia, then the carbon dioxide and finally the sodium chloride. However, the ammonia and carbon dioxide may, with advantage, be added in the form of ammonium carbonate or ammonium carbamate instead of being added as such. The sodium carbonate decahydrate and the ammonium chloride produced form simultaneously. The divergent crystal form and habit of these two salts, however, make possible their ready separation. They may be separated, for example, by simple screening, the sodium carbonate decahydrate crystals growing to a much larger size than the ammonium chloride crystals, or, for example, by permitting the ammonium chloride to crystallize while maintaining the sodium carbonate decahydrate in super-saturated solution, separating the ammonium chloride and thereafter crystallizing, by seeding for example, the sodium carbonate decahydrate.

In operations embodying the first of these alternatives, the sodium carbonate decahydrate and the ammonium chloride are precipitated simultaneously. The conditions under which these salts precipitate, by crystallization, are carefully maintained uniform in order to maintain approximately constant average crystal sizes. The sodium carbonate decahydrate is then separated from the solution and from the ammonium chloride, by the use of a coarse screen in a centrifuge permitting the finer ammonium chloride crystals to pass through with the solution, for example, and the ammonium chloride is then separated from the solution, by the use of a fine screen in a centrifuge, for example.

In operations embodying the second of these alternatives, the ammonium chloride is precipitated from the eutectic solution while maintaining the sodium carbonate decahydrate in super-saturated solution. The precipitated ammonium chloride is separated from the solution, by filtration or by centrifuging for example. The solution is then seeded to precipitate the sodium carbonate decahydrate in excess of saturation and the precipitated sodium carbonate decahydrate is separated from the solution, by filtration or centrifuging for example.

In carrying out the invention cyclically, an amount of water corresponding to that removed as water of hydration of the sodium carbonate decahydrate must be supplied in each repetition of the operation. This make-up water, instead of being supplied directly to the medium in which the conversion is effected, is with advantage first used as wash water, in part to free the sodium carbonate decahydrate from any contaminating ammonium chloride and in part to free the ammonium chloride from any contaminating sodium carbonate decahydrate.

I claim:

1. The improvement in the production of sodium carbonate decahydrate, which comprises precipitating sodium carbonate decahydrate and ammonium chloride from an aqueous eutectic solution of the same by the addition of sodium chloride, ammonia and carbon dioxide thereto at a temperature not exceeding about 15° C. while maintaining the ratio of $CO_2$ to free base in the solution from which the sodium carbonate decahydrate and ammonium chloride are precipitated at a value approximating 0.2–0.5, and separating the precipitated sodium carbonate decahydrate and ammonium chloride from the solution and from each other.

2. The improvement in the production of sodium carbonate decahydrate, which comprises precipitating sodium carbonate decahydrate and ammonium chloride from an aqueous eutectic solution of the same by the addition of sodium chloride, ammonia and carbon dioxide thereto at a temperature not exceeding about 15° C. while maintaining the ratio of $CO_2$ to free base in the solution from which the sodium carbonate decahydrate and ammonium chloride are precipitated at a value approximating 0.4–0.5, and separating the precipitated sodium carbonate decahydrate and ammonium chloride from the solution and from each other.

3. The improvement in the production of sodium carbonate decahydrate, which comprises precipitating sodium carbonate decahydrate and ammonium chloride from an aqueous eutectic solution of the same by the addition of sodium chloride, ammonia and carbon dioxide thereto at a temperature approximating 0° C. while maintaining the ratio of $CO_2$ to free base in the solution from which the sodium carbonate decahydrate and ammonium chloride are precipitated at a value approximating 0.2–0.5, and separating the precipitated sodium carbonate decahydrate and ammonium chloride from the solution and from each other.

4. The improvement in the production of sodium carbonate decahydrate, which comprises precipitating sodium carbonate decahydrate and ammonium chloride from an aqueous eutectic solution of the same by the addition of sodium chloride, ammonia and carbon dioxide thereto at a temperature not exceeding about 15° C. while maintaining the weight ratio of NaCl to the water content of the solution at a value approximating 1:6–1:12 and the molecular ratio of $CO_2$ to free base in the solution from which the sodium carbonate decahydrate and ammonium chloride are precipitated at a value approximating 0.2–0.5, and separating the precipitated sodium carbonate decahydrate and ammonium chloride from the solution and from each other.

GEORGE LEWIS CUNNINGHAM.